(12) United States Patent
Cathier et al.

(10) Patent No.: US 7,598,960 B2
(45) Date of Patent: Oct. 6, 2009

(54) SYSTEM AND METHOD FOR CACHE-FRIENDLY VOLUMETRIC IMAGE MEMORY STORAGE

(75) Inventors: Pascal Cathier, Bures (FR); Senthil Periaswamy, Malvern, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 778 days.

(21) Appl. No.: 11/185,602

(22) Filed: Jul. 20, 2005

(65) Prior Publication Data

US 2006/0018555 A1    Jan. 26, 2006

Related U.S. Application Data

(60) Provisional application No. 60/589,841, filed on Jul. 21, 2004.

(51) Int. Cl.
*G06F 12/02* (2006.01)
*G06T 15/00* (2006.01)

(52) U.S. Cl. .................. 345/566; 345/543; 345/419

(58) Field of Classification Search ............ 345/418, 345/419, 424, 530, 543, 557, 564, 566
See application file for complete search history.

(56) References Cited

U.S. PATENT DOCUMENTS

| | | | | |
|---|---|---|---|---|
| 6,512,517 | B1 * | 1/2003 | Knittel et al. | 345/424 |
| 7,133,041 | B2 * | 11/2006 | Kaufman et al. | 345/419 |
| 7,421,136 | B2 * | 9/2008 | Sirohey et al. | 382/240 |
| 2004/0136602 | A1 * | 7/2004 | Nagaraj et al. | 382/240 |

OTHER PUBLICATIONS

"Is Morton layout competitive for large two-dimensional arrays?", Thiyagalingam et al., 8th Int'l Euro-Par Conf Proc. (Lecture notes in Computer Science vol. 2400), Springer-Verlag Berlin, Germany 2002, pp. 280-288.

"A framework for high-performance matrix multiplication based on hierarchical abstractions, algorithms and optimized low-level kernels", Valsalam et al., Concurrency and Computation Practice & Experience, Preprint, vol. 14, No. 10, 2002, pp. 1-36.

"Nonlinear array layouts for hierarchical memory systems", Chatterjee et al, Conf Proc of 1999 Int'l Conf on Supercomputing, ACM NY, NY, 1999, pp. 444-453.

"An efficient semi-hierarchical array layout", Drakenberg et al., Proc. Workshop on Interaction Between Compilers and Computer Architectures, 2001, pp. 1-11.

"An address generator for a 3-dimensional pseudo-Hilbert scan in a cuboid region", Bandoh et al, Proc 1999 International Conference on Kobe, Japan, Oct. 24-28, 1999, Piscataway, NJ, USA, IEEE, US, vol. 1, Oct. 24, 1999, pp. 496-500.

\* cited by examiner

*Primary Examiner*—Kee M Tung
*Assistant Examiner*—Joni Hsu

(57) ABSTRACT

A method of storing a digital image in a computer memory includes providing a N-dimensional digital image, defining an offset for each image element $(x_1, \ldots, x_N)$ by the formula $$\mathit{offset}(x_1, \ldots, x_N) = \sum_i \sum_{n=1}^N K_{x_n}(i) x_{ni},$$

where i is summed over all bits and n is summed over all dimensions. The coefficient K for the $i^{th}$ bit of the $n^{th}$ dimension is defined as $$K_{x_n}(i) = \left( \prod_{j=1}^{n-1} f(x_j, 2^{i+1}, sx_j) \right) 2^i \left( \prod_{j=n+1}^{N} f(x_j, 2^i, sx_j) \right),$$

where $x_j$ is the $j^{th}$ dimension, $f(x,G,sx_j) = \min(G, sx_j - \lfloor x \rfloor_G)$ G is a power of 2, $sx_j$ represents the size associated with a given dimension, and $\lfloor x \rfloor_G = x - x \bmod G$. Image elements are stored in the computer memory in an order defined by the offset of each image element.

15 Claims, 2 Drawing Sheets

SYSTEM AND METHOD FOR CACHE-FRIENDLY VOLUMETRIC IMAGE MEMORY STORAGE

CROSS REFERENCE TO RELATED UNITED STATES APPLICATIONS

This application claims priority from "Cache-Friendly Volumetric Image Memory Storage", U.S. Provisional Application No. 60/589,841 of Cathier, et al., filed Jul. 21, 2004, the contents of which are incorporated herein by reference.

TECHNICAL FIELD

This invention relates to cache storage management in medical image processing.

DISCUSSION OF THE RELATED ART

Efficiency is an important factor for any real-life application development. In the field of image processing, the success of many theories is related to the existence of fast algorithms, e.g. Fast Fourier transforms or wavelets. Even simple concepts like distance transforms are still an active research field for increasing computation times.

When dealing with large volumetric images, however, a hardware issue known as cache-misses appears, and may become a bottleneck of an algorithm. In many cases, independently of the particular algorithm being used, the most time consuming task is accessing each voxel in the volumetric data. The reason for this is that many algorithms require a spatially local 3-D neighborhood (for example, convolution), and that the standard lexicographic storage order of pixels, for which spatially close points are often distant to each other in memory, causes many cache misses, which are very expensive.

In order to illustrate this more clearly, consider a typical volumetric algorithm such as 3-D separable convolution. Coding this the conventional way (access a line in the x direction, convolve, place results back, repeat for all x, repeat procedure along y and z directions), and using the conventional memory scheme for storing volumes (i.e. memory in a plane is contiguous, and all planes may be contiguous to one another), it turns out that more than 80% of the time used is only to read and write values in the z direction. A reimplementation of this convolution taking this factor into account, minimally looking for values in new planes, reduced the computation time by the same amount.

However, looking for new ways to implement existing algorithms in order to reduce cache misses is not always trivial and forces the designer to think in unfamiliar ways. While a cache-friendly version of the convolution was not too hard to implement, it could be more challenging to redesign, say, a level-set or a deformable model segmentation. In quite a few numbers of cases, it is actually impossible: a region growing algorithm, using updated intra-region statistics to grow, has to expand isotropically in space.

SUMMARY OF THE INVENTION

The present invention is directed to techniques for reducing cache misses when accessing image values, independently of the application. Exemplary embodiments of the invention as described herein generally include methods and systems for organizing voxels in memory such that algorithms that work in local neighborhoods can benefit without modification. The use of a memory image packing designed in accordance with the embodiment of the present invention can minimize cache misses without the user actually knowing it.

According to an aspect of the invention, there is provided a method for addressing a digital image in a computer memory comprising the steps of providing a digital image comprising a plurality of elements, wherein the size of said digital image can be expressed as a product of N-dimensions, wherein the size of each dimension is non dyadic, addressing each image element within a dyadic subset of said image with an optimal ordering scheme, and addressing each image element outside said dyadic subset with an alternative addressing scheme.

According to a further aspect of the invention, an address offset of an image element represented as $(x_1, \ldots, x_N)$ in said optimal ordering scheme is expressed as $$\text{offset}(x_1, \ldots, x_N) = \sum_i \sum_k 2^{Ni+(k-1)} x_{ki},$$

wherein $x_{ki}$ is the $i^{th}$ bit of the $k^{th}$ dimension, the range of the sum over k extends over the dimensions 1 to N, and the sum over i extends over the number of bits that represent each dimension.

According to a further aspect of the invention, each image element outside said dyadic subset is addressed with a lexicographic ordering scheme.

According to a further aspect of the invention, the method comprises defining an offset for each image element $(x_1, \ldots, x_N)$ by the formula $$\text{offset}(x_1, \ldots, x_N) = \sum_i \sum_{n=1}^N K_{x_n}(i) x_{ni},$$

wherein i is summed over all bits and n is summed over all dimensions, wherein $x_{ni}$ is the $i^{th}$ bit of the $n^{th}$ dimension, wherein the coefficient K for the $i^{th}$ bit of the $n^{th}$ dimension is defined as $$K_{x_n}(i) = \left( \prod_{j=1}^{n-1} f(x_j, 2^{i+1}, sx_j) \right) 2^i \left( \prod_{j=n+1}^N f(x_j, 2^i, sx_j) \right),$$

wherein $x_j$ is the $j^{th}$ dimension, $f(x_j, G, sx_j) = \min(G, sx_j - \lfloor x_j \rfloor_G)$, G is a power of 2, $sx_j$ represents the size associated with a given dimension, and $\lfloor x \rfloor_G = x - x \bmod G$, wherein said formula reduces to said optimal ordering scheme within said dyadic subset of said image.

According to a further aspect of the invention, the method comprises storing each image element in the computer memory in an order defined by the offset of each said image element.

According to a further aspect of the invention, N equals 3, and wherein the coefficients K are defined by $K_x(i) = 2^i f(y, 2^i, sy) f(z, 2^i, sz)$ $K_y(i) = f(x, 2^{i+1}, sx) 2^i f(z, 2^i, sz),$ $K_z(i) = f(x, 2^{i+1}, sx) f(y, 2^{i+1}, sy) 2^i$ wherein sx, sy, sz are the sizes associates with, respectively, the x, y, z dimensions.

According to a further aspect of the invention, the offset is defined by $$offset(x, y, z) = \sum_i (K_x(i)x_i + K_y(i)y_i + K_z(i)z_i),$$

wherein $x_i$, $y_i$, $z_i$ are the $i^{th}$ bit of the x, y, z coordinate, respectively.

According to another aspect of the invention, there is provided a method of addressing a digital image in a computer memory storage system comprising the steps of providing a digital image, wherein the size of said digital image can be expressed as a product of K-dimensions, allocating memory storage for said digital image, wherein the size of said allocated memory is the product of K powers of two, wherein each said power of two is the smallest power of two that is greater than the size of the associated dimension, and addressing each image element with an optimal ordering scheme.

According to a further aspect of the invention, the optimal ordering offset for each image element $(x_1, \ldots, x_K)$ is defined by the formula $$offset(x_1, \ldots, x_K) = \sum_i \sum_k 2^{Ki+(k-1)} x_{ki},$$

wherein $x_{ki}$ is the $i^{th}$ bit of the $k^{th}$ dimension, i is summed over all bits, and k is summed overt all dimensions.

According to a further aspect of the invention, K=3, and the coordinates are represented as (x, y, z), and the offset formula is defined by $$offset(x, y, z) = \sum_i (2^{3i} x_i + 2^{3i+1} y_i + 2^{3i+2} z_i),$$

wherein $x_i$, $y_i$, $z_i$ are the $i^{th}$ bits of the x, y, z coordinates, respectively.

According to a further aspect of the invention, the optimal ordering scheme is applied only to the N lowest order bits of the bit representation of each of the K dimensions.

According to a further aspect of the invention, the offset for each image element $(x_1, \ldots, x_K)$ is defined by the formula $$offset(x_1, \ldots, x_K) = \left( x_i + \sum_{k=2}^{K} x_k \prod_{j=1}^{K-1} N_{x_j} \right) \times 2^{N \times K} + \sum_i \sum_{k=1}^{K} 2^{K \times i + (k-1)} x_{ki},$$

wherein $x_k = x_k \bmod 2^N$, N is the number of bits over which i is summed, and $N_{x_k} = sx_k \bmod 2^K$, where $sx_k$ is the size associated with the $k^{th}$ dimension.

According to a further aspect of the invention, the number of dimensions is 3, represented by (x, y, z), and wherein the offset for each image element (x, y, z) is defined by $$offset(x, y, z) = (x + N_x \times (y + N_y \times z)) \times 2^{3N} + \sum_i (2^{3i} x_i + 2^{3i+1} y_i + 2^{3i+2} z_i).$$

According to another aspect of the invention, there is provided a method of addressing an image in a computer memory storage system comprising the steps of providing a image, wherein the size of said image can be expressed as a product of 3-dimensions, represented as $N_x \% N_y \% N_z$, subdividing each slice of size $N_x \% N_y$ into a plurality of subparts, each slice subpart being of size dx%dy, and storing each image subpart of size dx%dy%$N_z$ into memory in succession, and addressing all elements (x, y, z) of an image subpart before storing a next image subpart in memory.

According to another aspect of the invention, there is provided a program storage device readable by a computer, tangibly embodying a program of instructions executable by the computer to perform the method steps for addressing a digital image in a computer memory.

DETAILED DESCRIPTION OF THE PREFERRED EMBODIMENTS

Exemplary embodiments of the invention as described herein generally include systems and methods for cache friendly memory addressing and ordering schemes. In the interest of clarity, not all features of an actual implementation which are well known to those of skill in the art are described in detail herein.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

An issue with traditional image memory storage in connection with image processing comes from the fact that voxels that are close to each other in the image volume are not necessarily close to each other in memory. Therefore, local operations may have to look to locations in memory that are far away and are thus not cached. More specifically, for all voxels, there is at least one direct neighbor that lies far away in memory. This arises from the fact that volumes are stored in lexicographic order: the first slice in stored, followed by the second, etc. Neighbors in the z direction are thus separated in memory by an entire slice, which can be quite big (for example, 512%512 unsigned shorts, i.e. 512 Kb). In an ideal case, the image would be stored so that close points in space are also close in memory, but this is not topologically possible. An alternative is to reduce the occurrence of memory-scattered neighborhoods.

Figure 1:
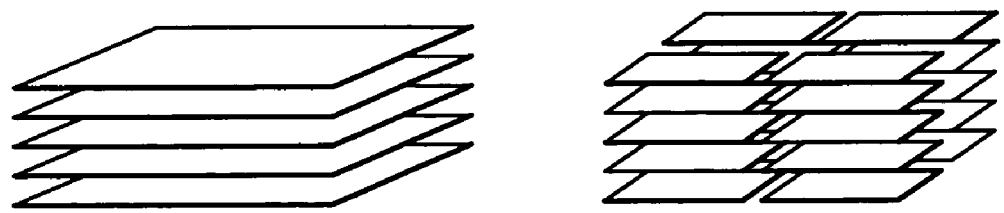
FIG. 1 is a schematic diagram comparing a traditional image memory storage with a collimator image storage scheme according to an embodiment of the invention.

Cache-misses occur because z-neighbors are stored far away in memory. This is due to the fact that image slices are large. For smaller images, this problem does not occur. Indeed, if the entire image fits inside the cache, the problem disappears. According to an embodiment of the invention, an image slice can be broken up into small parts so that several slices could be cached at the same time. One way is to divide a slice into smaller squares. Then, only one subpart of the slice is stored in memory, and then the corresponding subpart below it, etc. until the bottom of the image is reached. Then, the second slice subpart is stored, and its corresponding subparts below it, etc. until the entire image is finally stored. Thus, an image of size (sx%sy%sz) can be seen as a collection of images of size (dx%dy%sz), where dx and dy are small enough, and these images are stored the usual way. This approach, referred to herein as collimator storage order, is illustrated in FIG. 1. Referring to the figure, a traditional image memory storage scheme is depicted on the left side. The first slice is stored in memory, then the second, etc. On the right side is depicted a "collimator" storage wherein the original image is split into narrower images, that are themselves stored the usual way.

However, the collimator storage order approach can be improved upon. Note first that neighbor points are not optimally close to each other. There is still an entire slice between z-neighbors. It could help having close neighbors even closer because of the way the cache works in hierarchy. Second, it can be difficult to find an optimal size for a slice subpart, because cache size varies across configurations, and also because the behavior of the cache is quite complex.

Consider for simplicity that an image has a size of 16%16%16. Each voxel can be addressed with three volume coordinates (x, y, z) ranging from 0 to 15, hence each using 4 bits, say ($i_4$ $i_3$ $i_2$ $i_1$), where i=x, y or z. In memory, the offset corresponding to voxel (x, y, z) is therefore, in binary notation, $$\text{offset}(x, y, z) = (z_4 z_3 z_2 z_1 y_4 y_3 y_2 y_1 x_4 x_3 x_2 x_1).$$

This way of looking at memory storage shows clearly that the less significant bits of the z axis are already among the most significant bits of the offset.

In a collimator storage ordering, if the 16%16 slice is divided into four 8%8 subparts, the offset becomes:

$$\text{offset}(x, y, z) = (y_4 x_4 z_4 z_3 z_2 z_1 y_3 y_2 y_1 x_3 x_2 x_1),$$

i.e. the most significant bits of x and y have been pushed towards the most significant bits of the offset, leaving room for the less significant bits of z to shift on the right hand side. This highlights a deficiency of this storage, and suggests another storage format.

According to another embodiment of the invention, a storage ordering, referred to herein as an optimal storage order (OSO), can be defined, for a 16%16%16 image, as follows:

$$\text{offset}(x, y, z) = (z_4 y_4 x_4 z_3 y_3 x_3 z_2 y_2 x_2 z_1 y_1 x_1).$$

This ordering is optimal in the sense that the less significant bits of the three coordinates correspond to the three less significant bits of the offset, the second less significant bits of the coordinates correspond to the next three less significant bits of the offset, etc. In addition, this storage is parameter free. There is no need to tune the size of the subparts dx and dy. The cache size cutoff will automatically include the optimal number of least significant bits for x, y and z. In other words, what is accessible inside the cache and what is not is a matter of how far in memory one is jumping, i.e. there is some kind of thresholding on the distance. By packing the less significant bits first one ensures that whatever this threshold is, it includes an optimal number of less significant bits, and thus allows access to a maximum number of neighbors without cache penalty. For a cubic dyadic image, that is, an image where the range of the x,y,z indices are the same and are powers of two, the offset can be defined by the formula $$\text{offset}(x, y, z) = \sum_i (2^{3i} x_i + 2^{3i+1} y_i + 2^{3i+2} z_i),$$

where the range of the sum is from 0 to (1−N), where N is the number of bits in the binary representation of the indices (x,y,z). This formula can be extended to the case of non-cubic images by padding the indices of the smaller sized dimensions with leading order zero-bits, so that the same number of bits is used to represent each index. For example, for a 4%2%2 image, the respective maximum offsets are 3, which can be represented by 2 bits, and 1 and 1, which can be represented by 1 bit. However, the number 1 can also be represented by 2 bits, with the high order bit being set to zero.

Figure 2A:
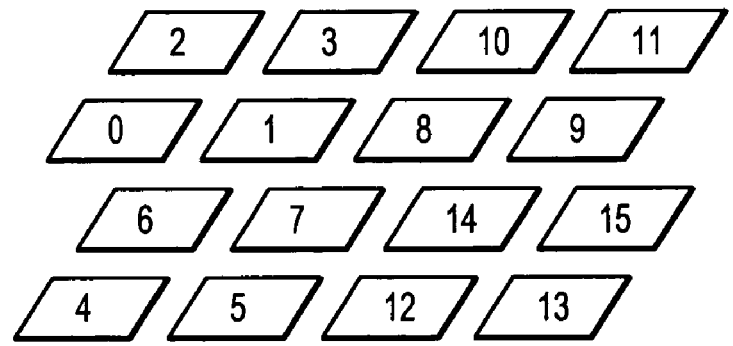
FIG. 2(a) is a schematic diagram illustrating image addressing according to an optimal storage ordering scheme according to an embodiment of the invention.
Figure 2B:
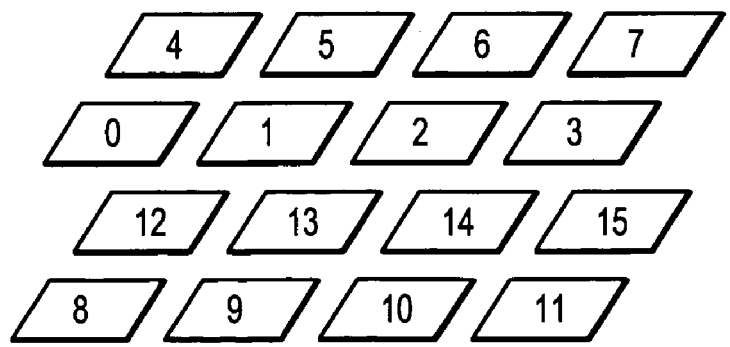
FIG. 2(b) is a schematic diagram illustrating image addressing according to a lexicographic ordering scheme according to an embodiment of the invention.

As an example of an optimal storage order, FIG. 2(a) depicts the offsets of eight voxels of a 4%2%2 image using the optimal storage order, while FIG. 2(b) depicts the offsets of the eight voxels of the 4%2%2 image in a lexicographic order. Notice that the voxels labeled 4, 5, 8, 9 in FIG. 2(b) are close to voxels 0, 1, but in this ordering scheme, voxels 2, 3, which are further away, are likely to be loaded into memory first. However, voxels 4, 5 of FIG. 2(b) are assigned indices 2, 3 in the optimal ordering scheme depicted in FIG. 2(a), while voxels 8, 9 of FIG. 2(b) are assigned indices 4, 5 in FIG. 2(a), and thus the voxels closer to 0, 1 will be loaded into memory first.

According to another embodiment of the invention, an optimal storage ordering scheme can be extended to an arbitrary number of dimensions, not just 3 dimensions. In the case of a dyadic sized cubic image, where the range of each dimension is the same, the offset formula can be expressed as $$\text{offset}(x_1, \ldots, x_K) = \sum_i \sum_k 2^{Ki+(k-1)} x_{ki},$$

where the range of the sum over the dimensions extends from 1 to K, where K is the number of dimensions. Again, this formula can be extended to a non-cubic case through the convention of using leading order zero bits for indices associated with the smaller sized dimensions.

An optimal storage order is a causal ordering, in that all the pixels (or voxels) have been ordered in a certain sequence. Scanning though these voxels in that order is "causal". An implied requirement here is that one should also be able to easily spot "past" neighbors, that is, neighbors of a given voxel that have a lower rank in this ordering.

However, there is no storage order that would store all neighbor points close to each other in memory, and this is true for this optimal storage order as well. So, even though every other voxel has its left neighbor stored just next to it, for one voxel out of 4 it is stored 8 pixels away, for one out of 8 it is stored 64 pixels away, etc.

However, having neighbors that are far apart is not an issue if, as the image is processed, one addresses voxels that are close to voxels that have been previously addressed. For example, in the case of the convolution mentioned above, one can efficiently convolve the image in the z direction by applying the filter in the lexicographical order, i.e. by increasing x. That is because, even if z-neighbors are far apart, z-neighbors of points stored close in memory are also close in memory.

When an optimal storage ordering according to an embodiment of the invention is used, a lexicographical order should not be used, if possible. First is that, by following the order of the voxels are they are stored in memory, it can be ensured that successively processed voxels are close to each other, and neighbors thereof also. Second, a lot of time can be wasted in computing the position of the next point, because the lexicographical order is no longer a natural ordering for the optimal storage ordering scheme. Note, however, that situations can arise where an optimal storage ordering can be used with a lexicographic ordering, as will be disclosed below.

There are cases where ordering is not a concern. For example, point-wise operations like adding two images are not sensitive to the particular order used. Similarly, for convolutions, not operating along a particular line is theoretically not a problem, except that values read from memory cannot be efficiently reused.

In other cases the ordering can be a concern. For example, some two-pass filters are traditionally used in a raster-line fashion, using a forward and a backward loop, such as fast distance transforms or fast labeling algorithms. If these algorithms were to maintain a lexicographic processing order on images using an optimal storage ordering of the invention, there would be a substantial time penalty. However, these filters can be applied in the optimal storage order, because the only restrictions for their forward and backward pass is that pixels are processed into a causal order, and that causal neighbors always lie in the same geometrical arrangement. As stated above, this constraint is also satisfied by an optimal storage order scheme according to an embodiment of the invention.

Another issue concerns the optimal storage ordering offset formula. An exemplary formula for accessing a voxel (x,y,z) in a 16%16%16 image, according to an embodiment of the invention, is:

$$\text{offset}(x, y, z) = (z_4 y_4 x_4 z_3 y_3 x_3 z_2 y_2 x_2 z_1 y_1 x_1).$$

While this formula is simple and implies only bit rearrangements, it is a non-standard transformation and can involve many instructions. It could eventually be more time consuming than the three additions and two multiplications used in the lexicographic order scheme to address a voxel.

The optimal storage ordering schemes of the embodiments of the invention presented above have been presented for the case where the image sizes are powers of two. In order to address the general case of non-dyadic sizes, there are at least two possible solutions. According to one embodiment of the invention, one allocates more memory than actually needed by the image in order to contain the image. According to another embodiment of the invention, no unnecessary memory is allocated and alternative ordering schemes are utilized near the image boundaries.

In the first embodiment of the invention for non-dyadic image sizes, a straightforward approach to handling an arbitrary image size is to include the image into the smallest dyadic image that can contain it. This can have a disadvantage that much more memory than is actually needed is allocated. In the worst-case scenario, where one or more of the dimensions of the image have a size of $2^n+1$, a dyadic image of nearly 8 times the size of the original image has to be allocated. In an average case scenario, one can expect to allocate about three times as much memory as is routinely needed.

In a variation of this embodiment of the invention, a way to limit this supervolume cost it to limit an optimal storage ordering scheme to a fixed number of less significant bits. For example, an optimal storage ordering scheme can be limited to the last 3 bits, and a lexicographical order can then be used on these cubes. The offset scheme becomes $$\text{offset}(x,y,z) = (x + N_x \times (y + N_y \times z)) \times 2^{3 \times 3} + (z_3 y_3 x_3 z_2 y_2 x_2 z_1 y_1 x_1)$$

where the first term of the right hand side of the equation corresponds to the standard volumetric lexicographic ordering of the cubes, with $x = x \bmod 2^3$, and $N_x = sx \bmod 2^3$ (and similarly for y and z). More generally, limiting an optimal ordering scheme to the low order N bits, the offset scheme can be defined as $$\text{offset}(x, y, z) = (x + N_x \times (y + N_y \times z)) \times 2^{3N} + \sum_i (2^{3i} x_i + 2^{3i+1} y_i + 2^{3i+2} z_i),$$

with $x = x \bmod 2^N$, and $N_x = sx \bmod 2^N$ etc.

In another embodiment of the invention, this ordering scheme can be extended to an arbitrary number of dimensions according to the offset formula $$\text{offset}(x_1, \ldots, x_K) = \left( x_i + \sum_{k=2}^{K} x_k \prod_{j=1}^{K-1} N_{x_j} \right) \times 2^{N \times K} + \sum_i \sum_k 2^{Ki+(k-1)} x_{ki},$$

where K is the number of dimensions, $x_k = x_k \bmod 2^K$, and $N_{x_k} = sx_k \bmod 2^K$, where $sx_k$ is the size associated with the $k^{th}$ dimension, etc. With this indexing scheme, the size of the supervolume is limited by the maximum number of least significant bits used in the rightmost term of previous equation. For example, if only the last three bits of each coordinate are used, the size of the supervolume is at most increased by $8^3 - 1 = 7$ in each dimension.

According to a second embodiment of the invention for non-dyadic image sizes, one ordering scheme that minimizes the supervolume involves dividing the image into smaller dyadic cubes. If the sub-cube fits entirely inside the image, then an optimal storage ordering scheme applies. If not, then another order applies, such as the standard lexicographic ordering scheme.

Another embodiment of the invention that minimizes the use of a supervolume to that necessary to contain the original volumetric data starts from an optimal storage order for a cubic dyadic image. Recall that the offset for this case can be defined by the formula $$offset(x, y, z) = \sum_i (2^{3i} x_i + 2^{3i+1} y_i + 2^{3i+2} z_i).$$

Note that the coefficient associated with a coordinate bit corresponds to the number of elements that can be scanned up to that bit, so that an increment of this bit yields a jump of the size of this coefficient. A modification of this formula according to this embodiment of the invention involves defining $$\lfloor x \rfloor_G = x - x \bmod G$$

and $$f(x, G, \text{size}) = \min(G, \text{size} - \lfloor x \rfloor_G),$$

where size is the size of the image in one of its dimension, and G is a power of two. Then, for the $i^{th}$ bit of, respectively, x, y and z, the coefficient is $$K_x(i) = 2^i f(y, 2^i, sy) f(z, 2^i, sz)$$

$$K_y(i) = f(x, 2^{i+1}, sx) 2^i f(z, 2^i, sz)$$

$$K_z(i) = f(x, 2^{i+1}, sx) f(y, 2^{i+1}, sy) 2^i$$

where sx, sy, sz are the sizes associated with, respectively, the x, y, z dimensions. Then, the above offset formula can be rewritten as $$offset(x, y, z) = \sum_i (K_x(i) x_i + K_y(i) y_i + K_z(i) z_i).$$

This formula can be used for the case of non-cubic dyadic images by observing that for a dyadic sized dimension x, x mod G=0.

As an example, this modified optimal storage ordering scheme provides the following ordering for a 5%5 2D image:

|    |    |    |    |    |
|----|----|----|----|----|
| 0  | 1  | 4  | 5  | 16 |
| 2  | 3  | 6  | 7  | 17 |
| 8  | 9  | 12 | 13 | 18 |
| 10 | 11 | 14 | 15 | 19 |
| 20 | 21 | 22 | 23 | 24 |

Similarly, an optimal storage ordering can be defined for an image with an arbitrary number of non-dyadic sized dimensions, according to another embodiment of the invention. In this embodiment of the invention, assuming that there are N dimensions, the offset coefficient for the $i^{th}$ bit of the $n^{th}$ coordinate can be defined as:

$$K_{x_n}(i) = \left( \prod_{j=1}^{n-1} f(x_j, 2^{i+1}, sx_j) \right) 2^i \left( \prod_{j=n+1}^{N} f(x_j, 2^i, sx_j) \right),$$

and the offset formula is $$offset(x_1, \ldots, x_N) = \sum_i \sum_{n=1}^{N} K_{x_n}(i) x_{ni}.$$

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 3:
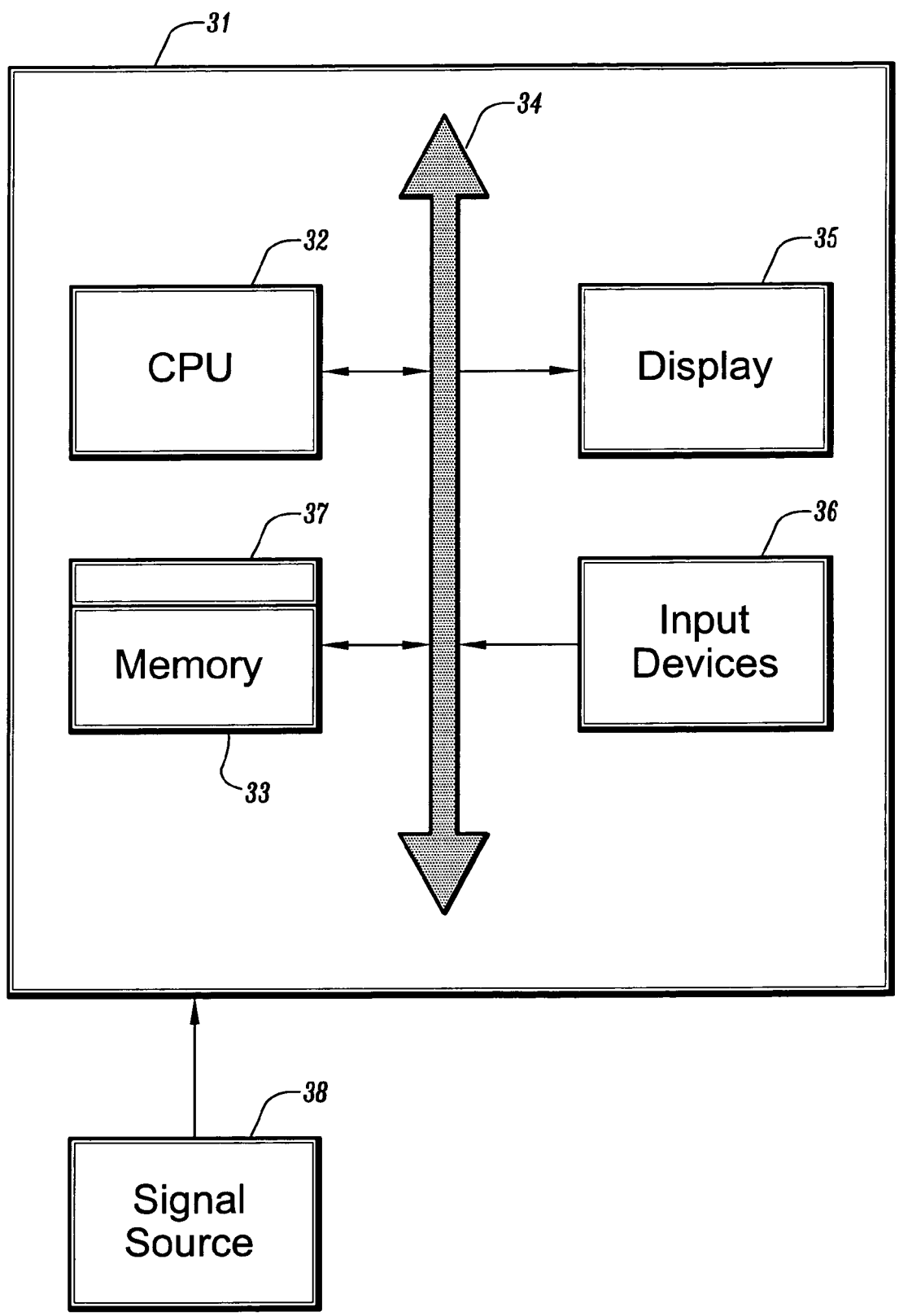
FIG. 3 is a block diagram of an exemplary computer system for implementing a cache friendly storage ordering scheme according to an embodiment of the invention.

Referring now to FIG. 3, according to an embodiment of the present invention, a computer system 31 for implementing the present invention can comprise, inter alia, a central processing unit (CPU) 32, a memory 33, and an input/output (I/O) interface 34. The computer system 31 is generally coupled through the I/O interface 34 to a display 35 and various input devices 36 such as a mouse and a keyboard. The support circuits can include circuits such as cache, power supplies, clock circuits, and a communication bus. The memory 33 can include random access memory (RAM), read only memory (ROM), disk drive, tape drive, etc., or a combinations thereof. The present invention can be implemented as a routine 37 that is stored in memory 33 and executed by the CPU 32 to process a signal from a signal source 38. As such, the computer system 31 is a general purpose computer system that becomes a specific purpose computer system when executing the routine 37 of the present invention.

The computer system 31 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of addressing a digital image in a computer memory, said method comprising the steps of:

providing a digital image comprising a plurality of elements, wherein the size of said digital image can be expressed as a product of N-dimensions, wherein the size of each dimension is non dyadic;

defining an offset for each image element $(x_1, \ldots, x_N)$, wherein the address offset of each image element in an optimal ordering scheme is expressed as $$\text{offset}(x_1, \ldots, x_N) = \sum_i \sum_k 2^{Ni+(k-1)} x_{ki},$$

wherein $x_{ki}$ is the $i^{th}$ bit of the $k^{th}$ dimension, the range of the sum over k extends over the dimensions 1 to N, and the sum over i extends over the number of bits that represent each dimension;

addressing each image element within a dyadic subset of said image with said optimal ordering scheme;

addressing each image element outside said dyadic subset with an alternative addressing scheme; and storing each image element in the computer memory in an order defined by the offset of each said image element.

2. The method of claim 1, wherein each image element outside said dyadic subset is addressed with a lexicographic ordering scheme.

3. A method of addressing a digital image in a computer memory, said method comprising the steps of:

providing a digital image comprising a plurality of elements, wherein the size of said digital image can be expressed as a product of N-dimensions, wherein the size of each dimension is non dyadic;

defining an offset for each image element $(x_1, \ldots, x_N)$ by the formula $$\text{offset}(x_1, \ldots, x_N) = \sum_i \sum_{n=1}^N K_{x_n}(i) x_{ni},$$

wherein i is summed over all bits and n is summed over all dimensions wherein $X_{ni}$ is the $i^{th}$ bit of the $n^{th}$ dimension, wherein the coefficient K for the $i^{th}$ bit of the $n^{th}$ dimension is defined as $$K_{x_n}(i) = \left(\prod_{j=1}^{n-1} f(x_j, 2^{i+1}, sx_j)\right) 2^i \left(\prod_{j=n+1}^N f(x_j, 2^i, sx_j)\right),$$

wherein $x_j$ is the $j^{th}$ dimension, $f(x_j, G, sx_j) = \min(G, sx_j - \lfloor x_j \rfloor_G)$, G is a power of 2, $sx_j$ represents the size associated with a given dimension, and $\lfloor x \rfloor_G = x - x \bmod G$, wherein said formula reduces to an optimal ordering scheme within a dyadic subset of said image;

addressing each image element within said dyadic subset of said image with said optimal ordering scheme;

addressing each image element outside said dyadic subset with an alternative addressing scheme; and storing each image element in the computer memory in an order defined by the offset of each said image element.

4. The method of claim 3, wherein N equals 3, and wherein the coefficients K are defined by $K_x(i) = 2^i f(y, 2^i, sy) f(z, 2^i, sz)$ $K_y(i) = f(x, 2^{i+1}, sx) 2^i f(z, 2^i, sz),$ $K_z(i) = f(x, 2^{i+1}, sx) f(y, 2^{i+1}, sy) 2^i$ wherein sx, sy, sz are the sizes associates with, respectively, the x, y, z dimensions.

5. The method of claim 4, wherein said offset is defined by $$\text{offset}(x, y, z) = \sum_i (K_x(i) x_i + K_y(i) y_i + K_z(i) z_i),$$

wherein $x_i$, $y_i$, $z_i$ are the $i^{th}$ bit of the x, y, z coordinate, respectively.

6. A method of addressing a digital image in a computer memory storage system, said method comprising the steps of:

providing a digital image, wherein the size of said digital image can be expressed as a product of K-dimensions;

allocating memory storage for said digital image, wherein the size of said allocated memory is the product of K powers of two, wherein each said power of two is the smallest power of two that is greater than the size of the associated dimension;

addressing each image element with at least an optimal ordering scheme, wherein the optimal ordering offset for each image element $(x_1, \ldots, x_K)$ is defined by the formula $$\text{offset}(x_1, \ldots, x_K) = \sum_i \sum_k 2^{Ki+(k-1)} x_{ki},$$

wherein $x_{ki}$ is the $i^{th}$ bit of the $k^{th}$ dimension, i is summed over all bits, and k is summed overt all dimensions; and storing each image element in the allocated memory in an order defined by said optimal ordering scheme.

7. The method of claim 6, wherein K=3, the coordinates are represented as (x, y, z), and the offset formula is defined by $$\text{offset}(x, y, z) = \sum_i (2^{3i} x_i + 2^{3i+1} y_i + 2^{3i+2} z_i),$$

wherein $x_i$, $y_i$, $z_i$ are the $i^{th}$ bits of the x, y, z coordinates, respectively.

8. A method of addressing a digital image in a computer memory storage system, said method comprising the steps of:

providing a digital image, wherein the size of said digital image can be expressed as a product of K-dimensions;

allocating memory storage for said digital image, wherein the size of said allocated memory is the product of K powers of two, wherein each said power of two is the smallest power of two that is greater than the size of the associated dimension;

addressing each image element with at least an optimal ordering scheme, wherein said optimal ordering scheme is applied only to the N lowest order bits of the bit representation of each of the K dimensions, wherein an offset for each image element $(x_1, \ldots, x_k)$ is defined by the formula $$\text{offset}(x_1, \ldots, x_K) = \left(x_1 + \sum_{k=2}^K x_k \prod_{j=1}^{K-1} N_{x_j}\right) \times 2^{N \times K} +$$

-continued $$\sum_i \sum_{k=1}^{K} 2^{K \times i + (k-1)} x_{ki},$$

wherein $x_k = x_k \mod 2^N$, N is the number of bits over which i is summed, and $N_{x_k} = sx_k \mod 2^K$, where $sx_k$ is the size associated with the $k^{th}$ dimension; and storing each image element in the allocated memory in an order defined by said optimal ordering scheme.

9. The method of claim 8, wherein the number of dimensions is 3, represented by (x, y, z), and wherein the offset for each image element (x, y, z) is defined by $$\mathit{offset}(x, y, z) = (x + N_x \times (y + N_y \times z)) \times 2^{3N} + \sum_i (2^{3i} x_i + 2^{3i+1} y_i + 2^{3i+2} z_i).$$

10. A program storage device readable by a computer, tangibly embodying a program of instructions executable by the computer to perform the method steps for addressing a digital image in a computer memory, said method comprising the steps of:

providing a digital image comprising a plurality of elements, wherein the size of said digital image can be expressed as a product of N-dimensions, wherein the size of each dimension is non dyadic;

addressing each image element within a dyadic subset of said image with an optimal ordering scheme, wherein an address offset of each image element represented as $(x_1, \ldots, x_N)$ in said optimal ordering scheme is expressed as $$\mathit{offset}(x_1, \ldots, x_N) = \sum_i \sum_k 2^{Ni+(k-1)} x_{ki},$$

wherein $x_{ki}$ is the $i^{th}$ bit of the $k^{th}$ dimension, the range of the sum over k extends over the dimensions 1 to N, and the sum over i extends over the number of bits that represent each dimension; and addressing each image element outside said dyadic subset with an alternative addressing scheme.

11. The computer readable program storage device of claim 10, wherein each image element outside said dyadic subset is addressed with a lexicographic ordering scheme.

12. A program storage device readable by a computer, tangibly embodying a program of instructions executable by the computer to perform the method steps for addressing a digital image in a computer memory, said method comprising the steps of:

providing a digital image comprising a plurality of elements, wherein the size of said digital image can be expressed as a product of N-dimensions, wherein the size of each dimension is non dyadic;

defining an offset for each image element $(x_1, \ldots, x_N)$ by the formula $$\mathit{offset}(x_1, \ldots, x_N) = \sum_i \sum_{n=1}^{N} K_{x_n}(i) x_{ni},$$

wherein i is summed over all bits and n is summed over all dimensions, wherein $x_{ni}$ is the $i^{th}$ bit of the $n^{th}$ dimension, wherein the coefficient K for the $i^{th}$ bit of the $n^{th}$ dimension is defined as $$K_{x_n}(i) = \left( \prod_{j=1}^{n-1} f(x_j, 2^{i+1}, sx_j) \right) 2^i \left( \prod_{j=n+1}^{N} f(x_j, 2^i, sx_j) \right),$$

wherein $x_j$ is the $j^{th}$ dimension, $f(x_j, G, sx_j) = \min(G, sx_j - \lfloor x_j \rfloor_G)$, G is a power of 2, $sx_j$ represents the size associated with a given dimension, and $\lfloor x \rfloor_G = x - x \mod G$, wherein said formula reduces to an optimal ordering scheme within said dyadic subset of said image;

addressing each image element within a dyadic subset of said image with said optimal ordering scheme; and addressing each image element outside said dyadic subset with an alternative addressing scheme.

13. The computer readable program storage device of claim 12, the method further comprising storing each image element in the computer memory in an order defined by the offset of each said image element.

14. The computer readable program storage device of claim 12, wherein N equals 3, and wherein the coefficients K are defined by $$K_x(i) = 2^i f(y, 2^i, sy) f(z, 2^i, sz)$$

$$K_y(i) = f(x, 2^{i+1}, sx) 2^i f(z, 2^i, sz),$$

$$K_z(i) = f(x, 2^{i+1}, sx) f(y, 2^{i+1}, sy) 2^i$$

wherein sx, sy, sz are the sizes associates with, respectively, the x, y, z dimensions.

15. The computer readable program storage device of claim 14, wherein said offset is defined by $$\mathit{offset}(x, y, z) = \sum_i (K_x(i) x_i + K_y(i) y_i + K_z(i) z_i),$$

wherein $x_i, y_i, z_i$ are the $i^{th}$ bit of the x, y, z coordinate respectively

* * * * *